United States Patent
Wiklund

[11] 3,966,328
[45] June 29, 1976

[54] DEVICE FOR GENERATING A SPATIAL REFERENCE PLANE

[75] Inventor: Klas Rudolf Wiklund, Taby, Sweden

[73] Assignee: AGA Aktiebolag, Lidingo, Sweden

[22] Filed: Aug. 25, 1975

[21] Appl. No.: 607,257

Related U.S. Application Data

[63] Continuation of Ser. No. 512,235, Oct. 7, 1974, abandoned.

[30] Foreign Application Priority Data

Oct. 16, 1973 Sweden .............................. 7314028

[52] U.S. Cl. .................................. 356/138; 350/7; 356/153
[51] Int. Cl.² ........................................ G01B 11/26
[58] Field of Search ............... 356/138, 4, 248, 153; 350/6, 285, 299, 169, 170, 173, 7; 178/7.6

[56] References Cited
UNITED STATES PATENTS

| | | | |
|---|---|---|---|
| 3,471,234 | 10/1969 | Studebaker | 356/138 |
| 3,619,069 | 11/1971 | Alexander | 356/138 |
| 3,656,828 | 4/1972 | Scholdstrom | 356/138 |
| 3,771,876 | 11/1973 | Ljungdahl et al. | 356/138 |
| 3,817,624 | 6/1974 | Martin | 356/138 |
| 3,820,903 | 6/1974 | Kindl et al. | 356/138 |

*Primary Examiner*—John K. Corbin
*Assistant Examiner*—Jon W. Henry
*Attorney, Agent, or Firm*—Lerner, David, Littenberg & Samuel

[57] ABSTRACT

An apparatus for visibly indicating a spatial plane is disclosed, including a light emitter for generating a beam of light, means for dividing said beam of light into a pair of light beams, and means for scanning that pair of light beams in a pair of planes, wherein the planes in which the light beams are scanned are adjacent, symmetrical, and on either side of the spatial plane which is to be indicated. Specifically, the light emitter is a laser, and the means for scanning the pair of light beams includes penta-prisms which are rotated for scanning purposes. Preferably, the light beams which are scanned include high and low tensity areas, and the low tensity areas overlap in the spatial plane to be indicated.

9 Claims, 4 Drawing Figures

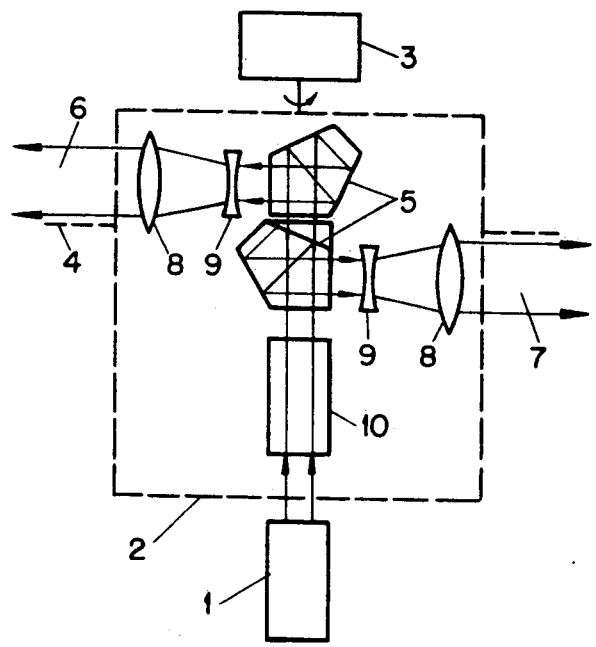
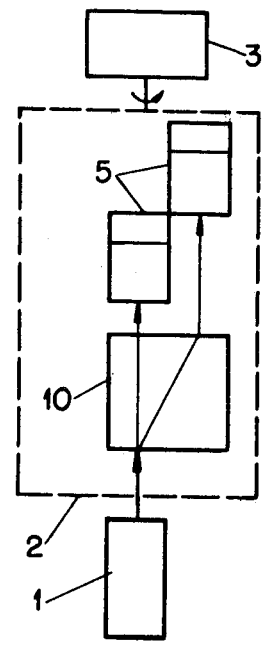
Fig 1
Fig 2
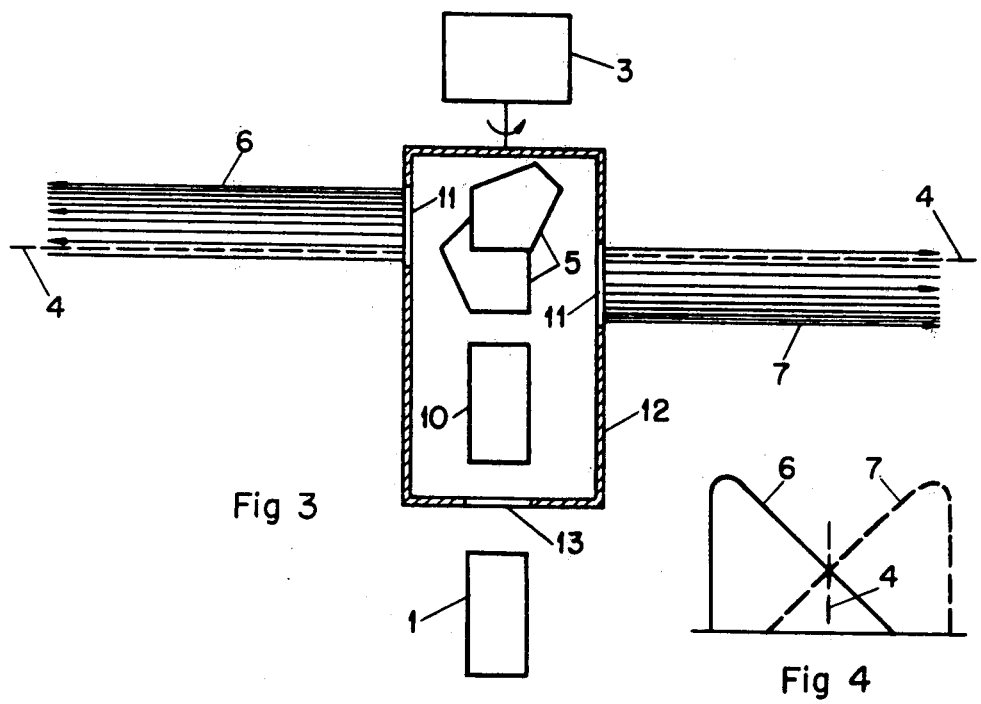
Fig 3
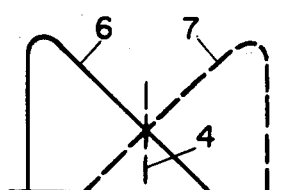
Fig 4

DEVICE FOR GENERATING A SPATIAL REFERENCE PLANE

This is a continuation of application Ser. No. 512,235 filed Oct. 7,1974 and now abandoned.

FIELD OF THE INVENTION

The present invention relates to a device for the visible indication of a spatial plane comprising a light transmitter for the generation of essentially parallel light, a rotating optical deflecting element receiving said light and generating a first and a second light beam, said element deflecting the first and second light beam and scanning these light beams.

BACKGROUND OF THE INVENTION

U.S. Pat. No. 3,656,828 relates to a device for producing a spatial reference plane. This known device comprises a laser which emits a light beam towards a rotating scanning head. From this head two laser beams are transmitted, one of which is directed at a small angle above the wanted reference system and the other at a small angle below the same reference plane. As a result the two beams on rotation form two conical surfaces. However, in these known devices the accuracy of the determination of the reference plane will decrease with increasing distance to the device, since the two beams form a certain angle with the plane to be indicated and consequently diverge.

SUMMARY OF THE INVENTION

The device in accordance with the invention eliminates the above-mentioned disadvantage connected with the divergence and provides an instrument which retains great accuracy over a greater distance range than the known devices.

The device in accordance with the invention is suitable for the setting out of heights on building sites. In the device according to the invention a rotating light is emitted which generates a reference plane around the whole instrument. In this manner ordinary levelling is reduced and the so called aligning is made simpler.

The device is characterized by the features disclosed by the appended claims.

BRIEF DESCRIPTION OF THE DRAWINGS

The device in accordance with the invention will be described in detail by way of the enclosed drawings, in which FIG. 1 shows a schematic view of the device in accordance with the invention;

FIG. 2 shows a schematic view taken perpendicular to that of FIG. 1;

FIG. 3 shows a further embodiment of the device in accordance with the invention; and FIG. 4 shows a graph of the distribution of intensity of the beams emitted by the device in FIG. 3.

DETAILED DESCRIPTION

FIGS. 1 and 2 show the device in accordance with the invention from the side, the elevation shown in FIG. 2 being obtained by rotating the device 90° in relation to FIG. 1. A laser 1 emits light towards a rotating head 2. The head 2 is rotated about an axis with the help of a motor 3. The wanted reference plane is designated 4 and is shown by dash lines. This plane may be horizontal or inclined by the desired dipping of the instrument.

The rotating head 2 comprises two penta-prisms 5 as deflecting elements. These penta-prisms are adapted so that one beam 6 is emitted lying parallel with and directly above the reference plane 4 and one beam is emitted parallel with and directly below said plane. By fitting elements in front of the penta-prisms which enlarge (expand) the surface of the beam without increasing its divergence, a greater distance range is achieved for the device without impairing the accuracy of the instrument. These expanding elements are shown only in FIG. 1 and consist of a positive and a negative lens, 8 and 9 respectively. To obtain a simple and reliable division of the light beam from the laser to the two penta-prisms a beam divider has been arranged in the embodiment shown in the Figures in the rotating head 2 between the laser and the penta-prisms. Such a beam divider 10 may consist, in a manner known per se, of a set of mirrors and semi-transparent mirrors or, in a simplet form of realization, of a plate of a double refracting material, e.g. a calcite crystal. Light which incides upon such a plate is divided into an ordinary and an extraordinary ray, the first of which passes straight through the crystal while the second is deflected at the entrance and exit. The result is a lateral displacement of the one partial beam. Both partial beams become polarized in directions perpendicular to one another on passing through the calcite crystal and they will have the same intensity provided the incident light is non-polarized or circular-polarized. The circular-polarization is achieved by introducing a polarizer between the laser and the beam divider (not shown in the drawings).

The reading of the reference plane which is generated by the device in accordance with the invention can be done by the naked eye. At levels which cannot be reached, an upwards and downwards movable photosensitive detector can be used mounted on an engraved bar. When the reading is to be done with the eye, it is appropriate to adapt the instrument so that the two light rays are emitted in opposite directions. If the deflecting elements of the instrument are arranged so as to rotate at 10 revolutions per second. The eye perceives the light rays as a flashing, if the eye is placed above or below the reference plane. This is due to the fact that the eye will then receive only the one ray whose flashing frequency is 10 Hz. If the eye is now moved so that it is in the reference plane, the flashing which is then received from both rays, and thus will have a frequency of 20 Hz will, owing to the inertia of the eye, be perceived as a constant light. The eye will thus perceive this constant light only when it is placed in the reference plane to be indicated, while if the eye is moved above or below this plane, the light will be perceived as flashing. Naturally, as mentioned earlier, photosensitive detectors may be used instead of the eye for the reading of the position of the plane. Such a detector may then consist for example of a single photocell, and the detector can decide whether it is in the reference plane or not. However, it cannot decide in the present case on which side of the reference plane it is placed. Futhermore, detectors provided with two photocells which are sensitive to light of different polarization may be used. As mentioned earlier, the beam divider 10 in FIGS. 1 and 2 can make it possible for the two emitted rays to have different polarization. If no such polarizing beam divider is used, the same properties of the emitted rays can of course be achieved by means of polarization filters. The detector which is thus sensitive to the differently polarized rays can then decide whether it is above, below, or in the reference plane to be indicated.

When scanning the reference plane by means of detectors it is not necessary for the directions of the two emitted rays to be opposite to one another, but it is sufficient if the rays are adapted so that they are not emitted in the same direction exactly at the same time.

In certain cases it may even be an advantage if the rays are not transmitted in opposite directions, since an electronic detector is capable of separating the two rays from one another if the interval in time between them is different and it is known whether the "first" ray in order of time is transmitted below or above the plane to be indicated. The detector device can then decide whether it is set too high or too low without the polarization mentioned earlier being necessary. What has just been said applies provided that the overlapping between the rays is such, and/or the detector not being farther away from the plane to be indicated than that both rays can be received without having to more the detector.

In FIG. 3 a laser is marked 1. The rotating head is enclosed in a housing 12 and is driven about an axis by the motor 3. In the housing 12 is a window or an aperture 13 for the radiation from the laser 1. Moreover, the housing 12 includes the beam divider 10 and the penta-prisms 5 in accordance with the FIGS. 1 and 2. The reference plane is marked 4 and the two beams 6 and 7 transmitted from the rotating head are overlapping each other somewhat as shown in the Figure. However, this embodiment does not include expanding elements, from which follows that the beams 6 and 7 are narrower than the corresponding beams in FIG. 1.

It has been found appropriate to use beams which do not have a uniformly spread out intensity. The intensity of these beams is greater in parts remote from one another and less where they overlap one another, and this has been illustrated schematically in the Figures by different distances between the individual rays. This intensity distribution is obtained by means of a grey scale which in the embodiment shown can be arranged in the window 11 in the housing 12. By choosing the damping achieved by means of the grey scale substantially linear with the cross-sectional diameter of the transmitted beam, and by allowing the beams partly to overlap one another, a graduated area can be obtained where a certain ratio between the intensity of the beams is a direct measure of the deviation from the reference plane. This means that an electronic detector can readily be provided with a scale which indicates the number of units, e.g. in millimeters, by which the detector deviates from the reference plane. Such a detector can be of special interest when it is a matter of controlling progress of one kind or another, e.g. if the detector is put on a bulldozer and is connected to a servo-loop for the controlling of the bulldozer-blade.

FIG. 4 shows the intensity distribution of the beams 6 and 7 in FIG. 3. It is evident from this that the intensity rises steeply in both directions from the plane to be indicated 4 shown schematically in FIG. 4. Owing to this it is easy for the eye or for an electronic detector to find the intensity minimum, that is to say, the plane to be indicated.

A method not mentioned above for allowing both the eye and an electronic detector to decide whether they should be raised or lowered in order to reach the plane to be indicated is to introduce a third beam into the instrument. The third beam should then be transmitted in the same plane as one of the other beams but with a displacement in time. For the eye it is most appropriate if this displacement is obtained by transmitting the beams at even division from the rotating deflecting element, that is to say with angles of 120° between one another.

If two of the beams are transmitted in a plane above the plane to be indicated and the third beam in a plane below the plane to be indicated and if the eye or the detector is above the plane to be indicated, the light will be perceived as double-flashing. If, on the other hand, the eye or the detector is below the plane to be indicated the light will be perceived as single-flashing. With the knowledge as to whether two of the beams are emitted below or above the plane to be indicated it will thus be easy to determine in which direction the eye or the detector have to be moved so as to fall into the plane to be indicated.

In case of the eye being used as a detector it is appropriate to choose the rate of rotation of the deflecting element so that when the eye is in the plane to be indicated, the three flashings which then hit the eye at one revolution of the deflecting element are perceived as a continuous light.

The third beam can be produced in a similar manner as described for the two other beams.

What is claimed is:

1. Apparatus for visibly indicating a spatial plane comprising a light emitter for generating a beam of light, means for dividing said beam of light into a first and second light beam directed in different directions in a first and second plane respectively, and means for scanning said first and second light beams in said first and second plane, respectively, said first and second planes being parallel to and on opposite sides of said spatial plane to be indicated.

2. The apparatus of claim 1 wherein said first and second light beams each include areas of increased intensity and areas of reduced intensity.

3. The apparatus of claim 1 wherein said means for dividing said beam of light into said first and second light beams comprises a beams divider adapted to laterally displace said second light beam with respect to said first light beam.

4. The apparatus of claim 2 wherein the areas of reduced intensity of said first and second light beams are scanned in said spatial plane to be indicated.

5. The apparatus of claim 1 wherein said means for scanning said first and second light beams comprises a pair of optical deflecting elements adapted to scan said first and second light beams in a direction normal to said beam of light generated by said light emitter.

6. The apparatus of claim 5 wherein said optical deflecting elements comprise penta-prisms.

7. The apparatus of claim 1 wherein said light emitter comprises a laser.

8. The apparatus of claim 1 wherein said means for scanning said first and second light beams include means for expanding said first and second light beams without causing said first and second light beams to diverge.

9. The apparatus of claim 1 wherein said means for scanning said first and second light beams include means for rotating said first and second light beams in said first and second planes, respectively, said first and second light beams being rotated at a rate so that said light transmitted in said spatial plane may be perceived as continuous, while said light transmitted outside of said spatial plane may be perceived as flashing.

* * * * *